(12) United States Patent
Liu et al.

(10) Patent No.: US 10,725,212 B2
(45) Date of Patent: Jul. 28, 2020

(54) LENS

(71) Applicant: Young Optics Inc., Hsinchu (TW)

(72) Inventors: Shih-Chang Liu, Hsinchu (TW);
Chih-Chun Huang, Hsinchu (TW);
Kai-Wei Hu, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 113 days.

(21) Appl. No.: 15/936,507

(22) Filed: Mar. 27, 2018

(65) Prior Publication Data
US 2018/0313983 A1    Nov. 1, 2018

(30) Foreign Application Priority Data

Apr. 28, 2017 (TW) .............................. 106114374 A

(51) Int. Cl.
| | |
|---|---|
| G02B 3/02 | (2006.01) |
| G02B 27/09 | (2006.01) |
| G02B 1/11 | (2015.01) |
| G02B 1/118 | (2015.01) |

(52) U.S. Cl.
CPC .................. G02B 3/02 (2013.01); G02B 1/11 (2013.01); G02B 1/118 (2013.01); G02B 27/0955 (2013.01)

(58) Field of Classification Search
CPC ..... G02F 2001/0151; G02F 2001/0152; G02F 2001/0153; G02F 2001/0154
See application file for complete search history.

(56) References Cited

U.S. PATENT DOCUMENTS

| | | | |
|---|---|---|---|
| 8,649,096 B2 | 2/2014 | Yamamoto et al. | |
| 2004/0032667 A1 | 2/2004 | Gale et al. | |
| 2004/0247010 A1* | 12/2004 | Okada | G02B 5/1866 372/102 |
| 2014/0016189 A1* | 1/2014 | Tamura | B29D 11/00326 359/356 |
| 2014/0254019 A1 | 9/2014 | Murata et al. | |

FOREIGN PATENT DOCUMENTS

WO    WO2014198198 A1    12/2014

OTHER PUBLICATIONS

Office action issued by China National Intellectual Property Administration dated Jun. 28, 2019.

\* cited by examiner

*Primary Examiner* — Joseph P Martinez
*Assistant Examiner* — Vipin Patel

(57) ABSTRACT

A lens includes a curved surface. A plurality of taper shape structures is formed on the curved surface, and each taper shape structure has at least three substantial flat surfaces. P is less than or equal to 500 nm. H is less than or equal to 500 nm. The P refers to the pitch between two adjacent taper shape structures. The H refers to maximum vertical distance between each taper shape structure and the curved surface.

7 Claims, 4 Drawing Sheets

LENS

FIELD OF THE INVENTION

The present invention relates to a lens, and more particularly to a lens having a function of anti-reflection.

BACKGROUND OF THE INVENTION

The main structure of the projector nowadays includes an illumination system, a light valve, and a projection lens, wherein the illumination system is used to provide an illumination beam, and the light valve is used to convert the illumination beam into an image beam. The projection lens is used to project the image beam on the screen, so that the image is formed on the screen. In the illumination system of the projector, a plurality of lenses is usually disposed on the transmission path of the incident light to improve the efficiency of the incident light. Since the incident light is affected by the difference between the refractive index of different media and an incident angle, a part of the incident light is lost due to the phenomenon of total reflection.

In order to solve the above problems, the industry has utilized a variety of techniques for making microstructures on lenses to improve the lens anti-reflection effect. For example, Lithographie Galvanoformung Abformung (LIGA) or E-Beam is used to perform the mold processing of the microstructures. However, in addition to the high cost, the mold processing only can make the microstructures on a plane or a gentle curved surface. Therefore, a lens produced by the process has poor anti-reflection effect. How to overcome the said problems become the focus of the ordinary skilled in the art.

SUMMARY OF THE INVENTION

The present invention provides a plurality of taper shape structures, and each of the taper shape structures has at least three substantial flat surfaces. P is less than or equal to 500 nm, and H is less than or equal to 500 nm; P refers to the pitch between two adjacent taper shape structures, and H refers to the maximum vertical distance between each of the taper shape structures and the curved surface. Since the lens of the embodiment of the invention has the taper shape structures with the P of less than or equal to 500 nm and the H of less than or equal to 500 nm, a graded index can be formed on the curved surface of the lens to further increase the anti-reflection effect of the curved surface of the lens and to decrease the reflectance of the lens in the visible wavelength range, thereby increasing the utilization of light.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting.

Figure 1A:
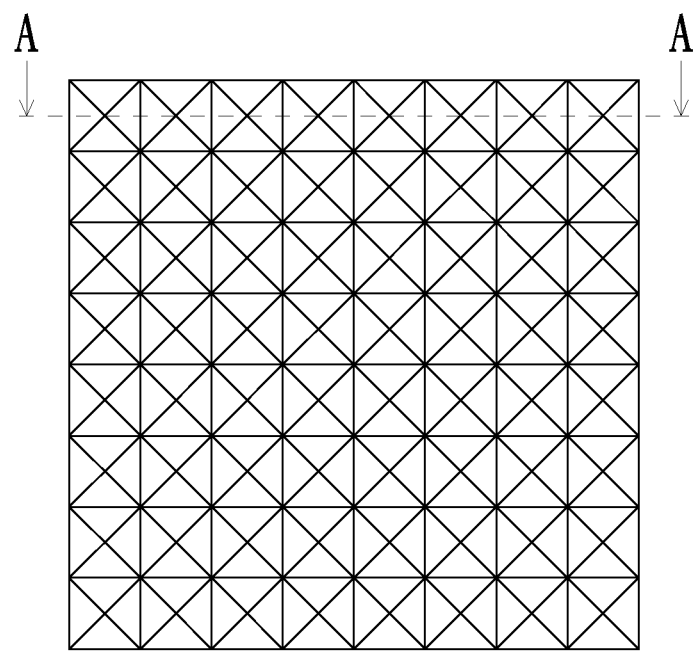
FIG. 1A is a schematic view of an array of the taper shape structures according to an embodiment of the present invention.
Figure 1B:
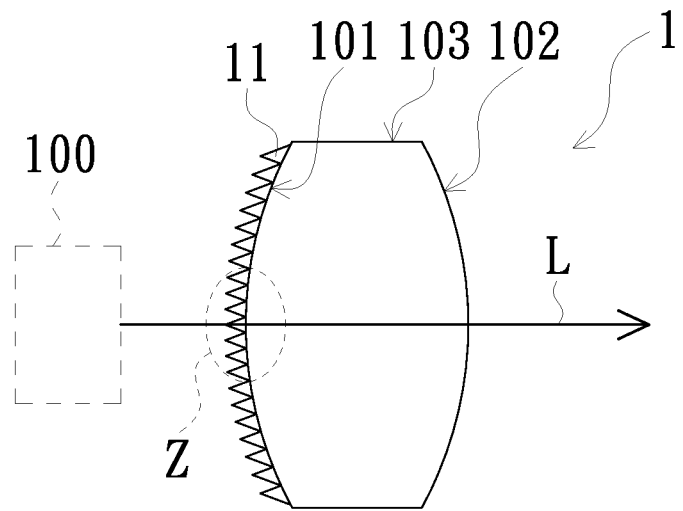
FIG. 1B is a schematic view of the lens according to an embodiment of the present invention.
Figure 2:
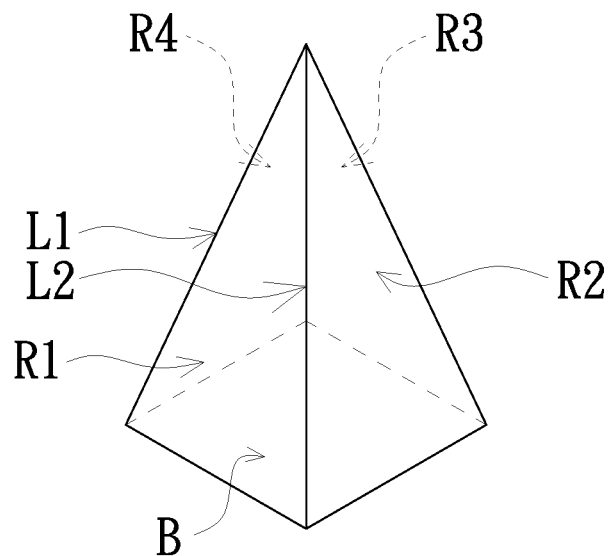
FIG. 2 is a perspective view of each of the taper shape structures of FIG. 1B.
Figure 3:
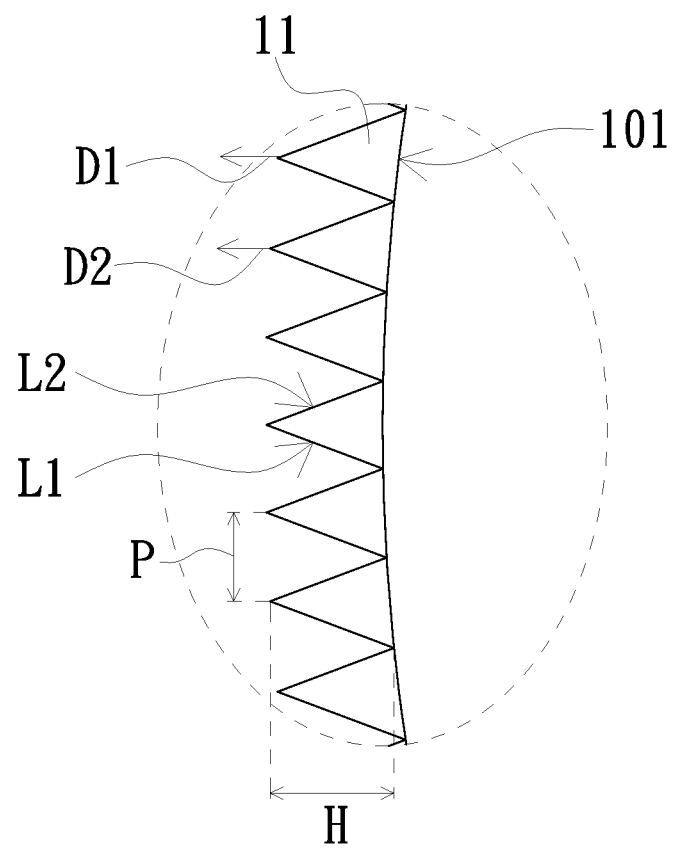
FIG. 3 is an enlarged view of the area Z shown in FIG. 1B.

Referring to FIGS. 1A and 1B to 3, FIG. 1A is a schematic view of an array of the taper shape structures in an embodiment of the present invention. FIG. 1B is a schematic view of the lens in an embodiment of the present invention. FIG. 2 is a perspective view of each of the taper shape structures of FIG. 1B. FIG. 3 is an enlarged view of the area Z shown in FIG. 1B. As FIG. 1B shows, the embodiment takes a projector as an example, and the projector includes an illumination source 100 and a lens 1 disposed on a transmission path of the light from the illumination source 100. The so-called lens in the invention is an optical component, which is made of at least partially transparent or at least partially transmissive material, such as plastic or glass. In the present embodiment, the lens is made of plastic by injection molding.

The lens includes at least one curved surface that can allow at least a part of light to pass through. The light source 100 of the invention is one of a laser source or a light emitting diode (LED) source or others, for example, an incandescent light source. In the embodiment, the light source refers to a plurality of packaged LED modules that is capable of emitting different colors respectively.

In the embodiment, the lens 1 has a light incident surface 101 close to the light source 100, a light exit surface 102 away from the light source 100, and a lateral edge 103 connected to the light incident surface and the light exit surface. In the embodiment, the light incident surface 101, the light exit surface 102, and the lateral edge 103 is a curved surface respectively. In the present embodiment, an anti-reflection structure layer consists of at least a plurality of taper shape structures 11 arranged in an array. The anti-reflection structure layer is formed on the curved surface of the light incident surface 101. However, the location of the anti-reflection structure layer is not limited, and in other embodiments, the anti-reflection structure layer may also be formed on the light exit surface 102 in addition to the light incident surface 101. That is, the light exit surface 102 may also have a plurality of taper shape structure 11. Alternatively, the anti-reflection structure layer can be formed only on the light exit surface 102 of the lens 1. Moreover, the anti-reflection structure layer may also be formed on the lateral edge of the lens in various designs described above, or may be formed only on the lateral edges.

In addition, referring to FIG. 1A, for example, in the embodiment, there is a plurality of taper shape structures 11 arranged in an array on the curved surface of the light incident surface 101 on the lens, wherein the base of each taper shape structure 11 is a rectangle, as FIG. 2 illustrates an example. And when the line A-A is a section line, it cross-sectional view is illustrated as referring to FIGS. 3 and 4.

As FIG. 2 shows, each taper shape structure 11 of the lens 1 of the embodiment has at least three substantial flat surfaces R and a base adjacent to and among the substantial flat surfaces or R1~R4, wherein the base B is connected to such as the curved surface of the light incident surface 101. In the embodiment, each taper shape structure 11 is, for example, a pyramid structure with four substantial flat surfaces R1~R4, wherein the shape of the base B is a polygon. Specifically, the substantial flat surfaces R1~R4 of the embodiment is inclined to each other, and the base B of the taper shape structure 11 is such as a quadrilateral. In another embodiment, each taper shape structure 11 may also have only three substantial flat surfaces R, and the base B of the taper shape structure 11 is such as a triangle.

More specifically, as shown in FIG. 2, the substantial flat surfaces R1~R4 of each taper shape structure 11 in the embodiment includes a first lateral edge L1 and a second lateral edge L2 which the said edges are mutually connected, and the first lateral edge L1 of each substantial flat surface R is connected to the second lateral edge L2 of the adjacent substantial flat surface R. And in the embodiment, each of the substantial flat surfaces is arranged in the clockwise direction as the first substantial flat surface R1, the second substantial flat surface R2, the third substantial flat surface R3 and the forth substantial flat surface R4. The first lateral edge L1 of the first substantial flat surface R1 is connected to the second lateral edge L2 of the forth substantial flat surface R4.

Figure 4:
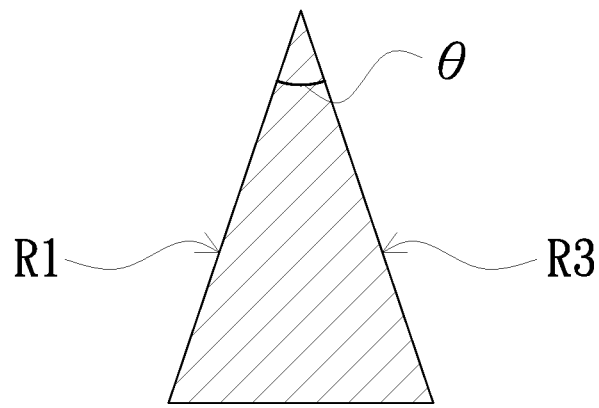
FIG. 4 is a perspective view of each of the taper shape structures of FIG. 3

It can be seen from FIG. 4 that there is a minimum included angle θ formed between the substantial flat surface R1 and the third substantial flat surface R3, and the minimum included angle θ is larger than or equal to 5 degrees, and less than or equal to 120 degrees. When the minimum included angle θ is less than 100 degrees, such as 90 degrees, it achieves good anti-reflection effect. When the minimum included angle θ is less than 50 degrees, such as 45 degrees, it achieves the preferred anti-reflection effect. When the minimum included angle θ is less than 25 degrees, it achieves the best anti-reflection effect. In the present embodiment, the minimum included angle is about 45 degrees.

Moreover, the ratio of the maximum height in each of the taper shape structures 11 to the maximum width of each of the taper shape structures 11 (i.e. the length, width ratio or the aspect ration of each taper shape structure 11) ranges between 0.5 and 100. When the aspect ratio is larger than or equal to 0.5, such as 0.5, the height is 0.5 times the width, a basic anti-reflection effect is achieved. When the aspect ratio is larger than 2, it achieves good anti-reflection effect. When the aspect ratio ranges between 2 and 10, it achieves better anti-reflection effect. When the aspect ratio ranges between 10 and 100 or more, it achieves the best anti-reflection effect. For example, in the present embodiment, the ratio of the height of each taper shape structure 11 to the width of each taper shape structure 11 is about 2.41.

Figure 5:
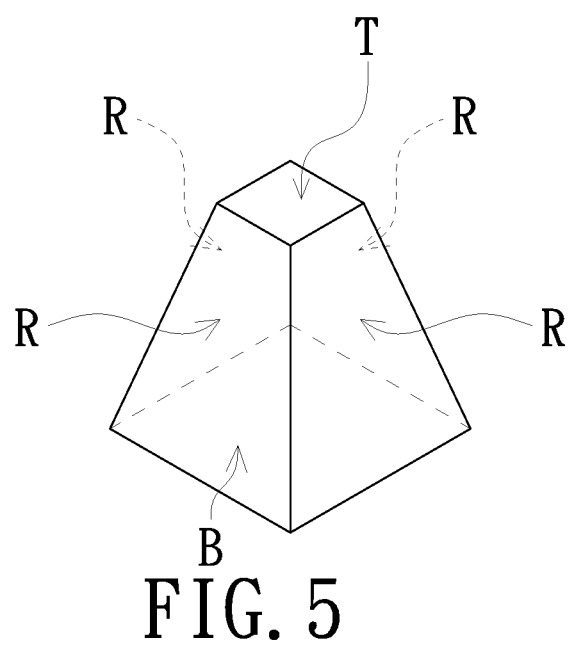
FIG. 5 is a schematic view of an array of the taper shape structure according to another embodiment of the present invention.

It is necessary to note that in the embodiment, each taper shape structure 11 is a pyramid structure with four substantial flat surfaces R1~R4 and a base B in the shape of a polygon, which is only one of the embodiments of the invention, and not limited to the invention. In the other embodiment, as shown in FIG. 5, each taper shape structure 11a includes a base B connected to the curved surface and an apex T opposite to the base, where the substantial flat surface R is located between the base B and the apex T, and the apex T of each taper shape structure 11a is a flat surface. That is, in the embodiment, each taper shape structure 11a is, for example, a frustum structure with a base B in the shape of a polygon (which can be also called a top-cut body structure).

As shown in FIG. 3, in the taper shape structures 11 of the lens 1 of the embodiment, there is a pitch P set between two adjacent taper shape structures 11, wherein the pitch P is the minimum straight distance between two apexes of two adjacent taper shape structures 11. There is a maximum vertical distance H set between each taper shape structure 11 and the curved surface of the light incident surface 101 for example. That is, the vertical distance from the apex of each taper shape, structure 11 to its base is the height of the taper shape structure 11. When the maximum vertical distance H of the taper shape structure 11 of the invention is below 500 nm, it achieves a basic anti-reflection effect. When the H is below 400 nm, it achieves preferred anti-reflection effect. When H is less than 350 mm, it also achieves preferred anti-reflection effect. Like the pitch P, when the pitch P is smaller than 500, 400, and 350 nm, it achieves the basic, preferred, and the best improved effects respectively. In the embodiment, the pitch P and the maximum vertical distance are about 400 nm and about 500 nm respectively. It is worthy to note that, as shown in FIG. 3, the pitch P between two adjacent taper shape structures 11 of the embodiment and the maximum vertical distance H between each taper shape structure 11 and the curved surface can be adjusted according to the demand in the actual situation. When the ratio of the pitch P to the maximum vertical distance H is less than 3, that is, the distance between the taper shape structure 11 and another taper shape structure is three times the height of the taper shape structure 11, it achieves the basic anti-reflection effect. When the ratio is less than 1.5, it achieves the preferred effect. When the ratio is less than 0.5, it achieves the best effect. In the embodiment, the ratio of P over H (P/H) is about 0.8. When the minimum included angle of each taper shape structure is 90 degrees, and the taper shape structures are connected to each other, its P/H is close to 1 regarding the radius of the curvature of the lens.

In addition, as FIGS. 1B to 3 show, each taper shape structure 11 of the embodiment has an extending direction extending in a direction away from the curved surface, and the extending directions of the taper shape structures are substantially parallel to each other. For example, one of the taper shape structures 11 (as the first taper shape structure at right side in FIG. 3 shows) has a first extending direction D1 extending in a direction away from the curved surface, whereas the other one of the taper shape structure 11s (as the second taper shape structure at right side in FIG. 3 shows) has a second extending direction D2 extending in a direction away from the curved surface, wherein the first extending direction D1 is parallel to the second extending direction D2. And in the embodiment, the first extending direction D1 and the second extending direction D2 both are not parallel to the normal direction of a plane that the corresponding taper shape structure 11 is located on.

By the taper shape structure 1 formed on the curved surface of the lens 1, the curved surface side of the lens 1 may have graded refractive index, further increasing the anti-reflection effect of the curved surface of the lens 1, so as to decrease the reflectance of the lens in the visible wavelength range. Accordingly, most light L can be emitted from the light exit surface 102 of the lens 1, further increasing the utilization of light. The following further describes the detail structure of these taper shape structures 11 of the lens in the embodiment.

As shown in FIGS. 1B to 3, the lens 1 of the embodiment is, for example, is manufactured by turning process, to machining a number of pyramid structures on a curved surface of a core or cavity of a mold by turning tool, then utilized the mold with pyramid-type structures to perform the injection molding, thereby making the lens 1 having the taper shape structures 11. That is, the taper shape structures 11 and the curved surface of the lens 1 are one piece formed by a single piece of material It means that the taper shape structures 11 in the embodiment is not the form of a film sticking on each curved surface of the lens 1. It is necessary to note that the previous one piece formed taper shape structures 11 and the curved surface of the lens 1 is only one of the embodiments of the invention, and not limited to the invention. In another embodiment, the taper shape structures 11 is in the form of the film sticking on each curved surface of the lens.

Figure 6:
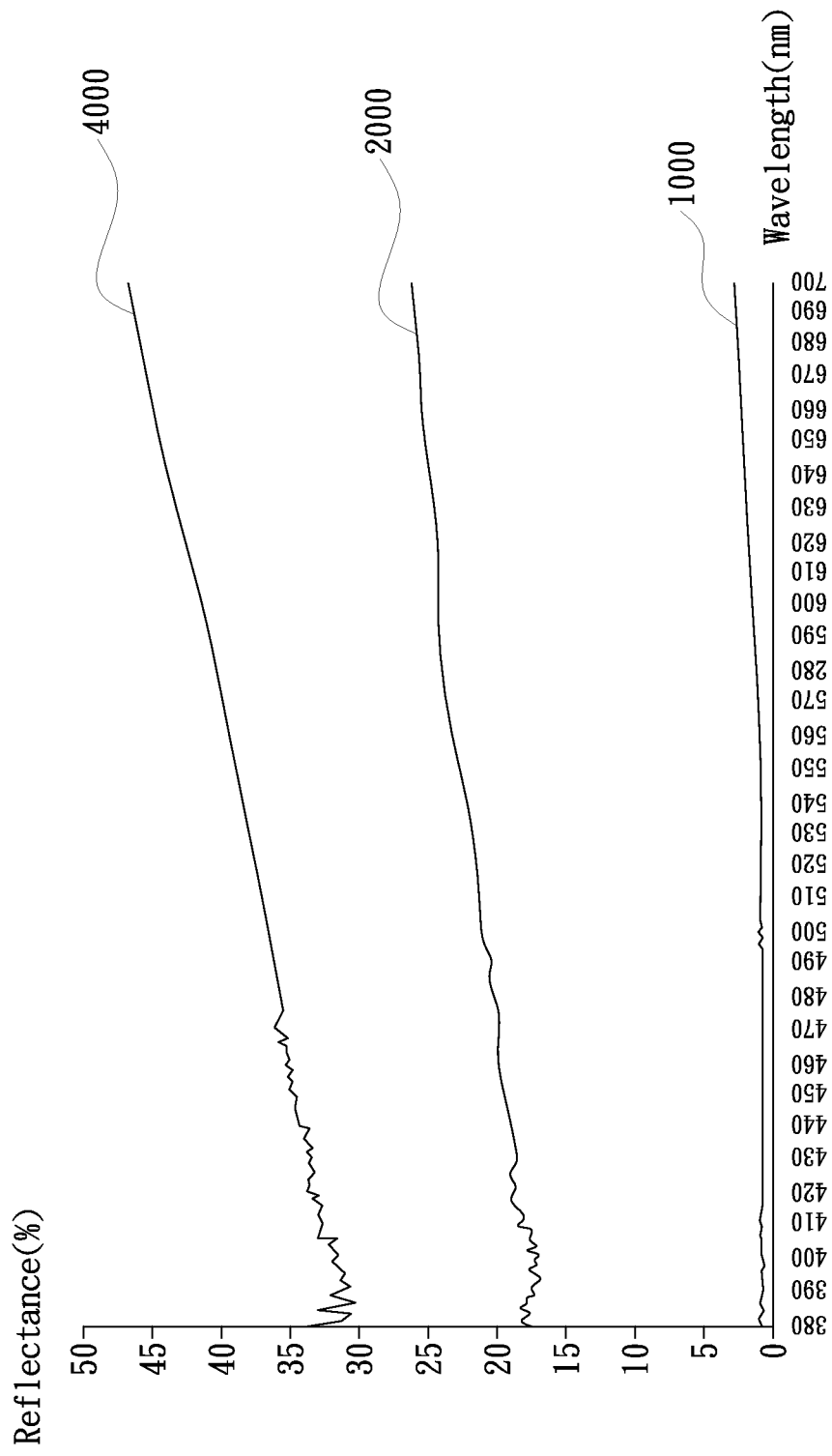
FIG. 6 is a schematic view of a comparison of the reflectances of the taper shape structures shown in FIG. 1B to 4 and other anti-reflection structure.

Refer to FIG. 6, which is a schematic view of a comparison of the reflectances of the taper shape structures shown in FIG. 1B to 4 and other anti-reflection structure. As shown in FIG. 6, a curve 1000 in the figure represents the reflectance of the taper shape structures 11 each with the size of 300 nm*300 nm on the curved surface of the lens 1 in the embodiment in the specific visible wavelength range; a curve 2000 represents a reflectance of V-grooves each with the size of 300 nm*300 nm in the specific visible wavelength range; a curve 3000 represents a reflectance of a unprocessed hyper-fine plane in the specific visible wavelength range. It can be known from FIG. 6 that the reflectance of the taper shape structures 11 of the embodiment in the visible wavelength ranging between 400 nm and 700 nm ranges between 0.8% and 2.75%; the reflectance of the V-grooves in the visible wavelength ranging between 400 nm and 700 nm ranges between 17.4% and 26.1%; the reflectance of unprocessed hyper-fine plane in the visible wavelength ranging between 400 nm and 700 nm ranges between 32.2% and 46.4%. Therefore, under the same visible wavelength range, the reflectance of the taper shape structure 11 of the embodiment (0.8%~2.75%) is obviously less than the reflectance of the V-grooves (17.4%~26.1%) and the reflectance of the unprocessed hyper-fine plane (32.2%~46.4%).

To sum up, the lens according to one of the embodiments of the present invention may have graded refractive index on the one side of the lens to further increase the anti-reflection effect of the curved surface of the lens, thereby decreasing the reflectance of the lens in the visible wavelength range, so that most of the light can be emitted from the light exit surface of the lens, thereby increasing the utilization of light.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lens, comprising taper shape structures disposed on a curved surface of the lens, wherein there is a pitch of less than 500 nm between two adjacent taper shape structures, and a base of each of the taper shape structures is a polygon, wherein a height of the each of the taper shape structures is less than 500 nm, the taper shape structures and the curved surface are one piece formed, wherein an aspect ratio of the each of the taper shape structures is a ratio of a maximum height to a maximum width of the each of the taper shape structures, and the aspect ratio ranges between 2 and 100.

2. The lens according to claim 1, wherein the each of the taper shape structures is a frustum with a polygonal base.

3. The lens according to claim 1, wherein the each of the taper shape structures has an extending direction extending in a direction away from the curved surface, and the extending directions of the taper shape structures are substantially parallel to each other.

4. The lens according to claim 1, wherein the each of the taper shape structures has at least three substantial flat surfaces.

5. The lens according to claim 4, wherein the substantial flat surfaces of the taper shape structures include a first lateral edge and a second lateral edge corresponding to the first lateral edge, wherein the first lateral edge of the substantial flat surfaces is connected to the second lateral edge of another substantial flat surface.

6. The lens according to claim 5, wherein the each of the taper shape structures has an extending direction extending in a direction away from the curved surface, and the extending directions of the taper shape structures are substantially parallel to each other.

7. The lens according to claim 1, comprising a light incident surface and a light exit surface, wherein the light incident surface has the curved surface.

* * * * *